US007638226B2

(12) United States Patent
Ellwood et al.

(10) Patent No.: US 7,638,226 B2
(45) Date of Patent: Dec. 29, 2009

(54) APPARATUS AND METHOD FOR CONTROLLING KINETIC RATES FOR INTERNAL REFORMING OF FUEL IN SOLID OXIDE FUEL CELLS

(75) Inventors: Kevin Ellwood, Ann Arbor, MI (US); Stephen Harris, Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 928 days.

(21) Appl. No.: 10/710,459

(22) Filed: Jul. 13, 2004

(65) Prior Publication Data

US 2006/0014057 A1     Jan. 19, 2006

(51) Int. Cl.
*H01M 8/00* (2006.01)
(52) U.S. Cl. ..................................................... 429/40
(58) Field of Classification Search ................ 429/30, 429/40, 35, 36, 41, 44, 45, 46
See application file for complete search history.

(56) References Cited

U.S. PATENT DOCUMENTS

| | | | |
|---|---|---|---|
| 5,914,200 | A | 6/1999 | Schabert et al. |
| 5,998,056 | A | 12/1999 | Divisek et al. |
| 6,221,280 | B1 | 4/2001 | Anumakonda et al. |
| 6,544,676 | B2 | 4/2003 | Lim et al. |
| 6,653,005 | B1 | 11/2003 | Muradov |
| 2001/0053467 | A1 | 12/2001 | Kaneko et al. |
| 2003/0035989 | A1 | 2/2003 | Gorte et al. |
| 2003/0118879 | A1 | 6/2003 | Barnett et al. |
| 2003/0165727 | A1 | 9/2003 | Priestnall et al. |
| 2005/0058881 | A1* | 3/2005 | Goebel et al. .................. 429/40 |

(Continued)

FOREIGN PATENT DOCUMENTS

EP     0173904 A1     3/1986

(Continued)

OTHER PUBLICATIONS

European Search Report, dated Apr. 24, 2008, including European Search Opinion, 7 pages total.

(Continued)

*Primary Examiner*—Patrick Ryan
*Assistant Examiner*—Monique Wills
(74) *Attorney, Agent, or Firm*—Damian Porcari; Brooks Kushman P.C.

(57) ABSTRACT

The present invention provides a solid oxide fuel cell in which kinetic rates for internal reforming are controlled. The solid oxide fuel cell comprises a cathode, an electrolyte layer adjacent to the cathode, and an anode adjacent to the electrolyte layer. The anode used in the cell of the invention includes a support structure which defines at least a portion of an anode flow channel and a catalyst that promotes reforming. The anode flow channel has an anode flow channel entrance for the introduction of fuel to the solid oxide fuel cell and an anode flow channel exit for removing unreacted fuel and/or by-products. The catalyst is dispersed within or upon the support structure such that the rate of reforming increases at increasing distances from the anode flow channel entrance. The present invention also provides a method of controlling internal reforming kinetic rates in a solid oxide fuel cell.

17 Claims, 3 Drawing Sheets

U.S. PATENT DOCUMENTS

2005/0074650 A1 * 4/2005 Sridhar et al. .................. 429/30

FOREIGN PATENT DOCUMENTS

| | | |
|---|---|---|
| JP | 63310574 | 12/1988 |
| WO | 0233771 A2 | 4/2002 |
| WO | 02058169 A2 | 7/2002 |
| WO | WO 02/058169 A2 | 7/2002 |
| WO | 03075388 A1 | 9/2003 |
| WO | 03094268 A2 | 11/2003 |
| WO | 03094268 A3 | 11/2003 |
| WO | WO 03/094268 A2 | 11/2003 |
| WO | WO 03/094268 A3 | 11/2003 |
| WO | 2004109821 A2 | 12/2004 |
| WO | 2005011019 A2 | 2/2005 |

OTHER PUBLICATIONS

Nguyen Minh; Solid Oxide Fuel Cell Hybrid System for Distributed Power Generation; Jul. 2004; GE Hybrid Power Generation Systems, 42 pages.

* cited by examiner

APPARATUS AND METHOD FOR CONTROLLING KINETIC RATES FOR INTERNAL REFORMING OF FUEL IN SOLID OXIDE FUEL CELLS

BACKGROUND OF INVENTION

1. Field of the Invention

The present invention relates to an apparatus and method for controlling internal reforming kinetic rates in a solid oxide fuel cell.

2. Background Art

Fuel cells are electrochemical devices that convert the chemical energy of a fuel into electricity and heat without fuel combustion. In the one type of fuel cell hydrogen gas and oxygen gas are electrochemically combined to produce electricity. The hydrogen used in this process may be obtained from natural gas or methanol while air provides the oxygen source. The only by-products of this process are water vapor and heat. Accordingly, fuel cell-powered electric vehicles reduce emissions and the demand for conventional fossil fuels by eliminating the internal combustion engine (e.g., in completely electric vehicles) or operating the engine at only its most efficient/preferred operating points (e.g., in hybrid electric vehicles). However, while fuel cell-powered vehicles have reduced harmful vehicular emissions, they present other drawbacks.

Solid oxide fuel cells ("SOFCs") are a type of fuel cell design that is currently undergoing significant development. In some types of SOFCs, hydrocarbon fuel is fed to an anode and an oxygen containing gas is fed to the cathode. Although direct oxidation of hydrocarbon fuels at solid oxide fuel cells is desirable, typically it is necessary to reform the fuel (i.e., convert the fuel to hydrogen and carbon monoxide). Operating SOFCs by directly supplying fuel to the cell can reduce size requirements. In addition, it is possible that lower system costs and greater system efficiency can be realized by operating via direct oxidation. SOFCs may be considered to be systems or reactors that generate electrical power much like a battery, the difference being that the fuel cell is a continuous-flow reactor. The ability of SOFCs to tolerate impurities in the fuel makes it possible to process (reform) the hydrocarbon fuels within the cell. This should be contrasted to PEM fuel cells which require extremely pure hydrogen to avoid becoming poisoned, and onboard reforming does not deliver hydrogen that is sufficiently pure. Typically, nickel is used as a catalyst in SOFC anodes to raise its electrical conductivity and, fortunately, the nickel can also catalyze the reforming of hydrocarbon compounds.

There are two key factors in the thermal processes taking place in the reforming step of an operating SOFC. The reforming step is highly endothermic, that is, energy is consumed by the reaction. For example, the enthalpy for reforming reaction converting methane to carbon monoxide and hydrogen is +226 kJ/mol at 800° C. Secondly, the cell oxidation reactions are exothermic, with an enthalpy of reaction of −273 kJ/mol, assuming all of the hydrogen and carbon monoxide are consumed. Comparing the energies of these two thermal processes, there is a reasonable balance between the two reactions, averaged over an entire fuel cell surface. If the two sets of reactions happened in the same location at the same time, most of the thermal effects would cancel, and there would be only a modest temperature change in the SOFC during operation. Unfortunately. the reactions do not generally occur at the same locations. One consequence of this is that the fast reforming reactions lead to local cooling in the entrance region of SOFCs resulting in high thermal stresses. Ultimately, this localized stress can lead to cracking and failure of the SOFC cell structure.

Accordingly, there exists a need for methods of controlling internal reforming kinetic rates in a solid oxide fuel cell such that such fuel cells are subjected to lower amounts of internal stress.

SUMMARY OF INVENTION

The present invention overcomes one or more problems of the prior art by providing in at least one embodiment a solid oxide fuel cell in which kinetic rates for internal reforming are controlled. The solid oxide fuel cell of the invention comprises a cathode, an electrolyte layer adjacent to the cathode, and an anode adjacent to the electrolyte layer. Moreover, the cathode, electrolyte layer, and the anode may be arranged in a planar configuration or in a concentric configuration. The anode used in the cell of the invention includes a support structure which defines at least a portion of an anode flow channel and a catalyst that promotes reforming. The anode flow channel has an anode flow channel entrance for the introduction of fuel to the solid oxide fuel cell and an anode flow channel exit for removing unreacted fuel and/or by-products. The catalyst is dispersed within or upon the support structure such that the rate of reforming increases at increasing distances from the anode flow channel entrance. By increasing the catalyst concentration in the direction of fuel flow you are "effectively" spreading the hydrocarbon conversion along the flow direction since the rate of reforming is proportional to the catalyst concentration. Once the reforming starts, the hydrocarbon concentration will drop along the flow direction, which will also slow the reaction rate. This drop in hydrocarbon concentration will allow the catalyst concentration to be raised to a higher value in the fuel downstream direction. Typically, this increasing rate is achieved by providing a catalyst concentration profile in which the catalyst has a first concentration at a first position and a second concentration at a second position such that the first position is closer to the anode flow channel entrance than the second position and the first concentration is lower than the second concentration. Although the regions of the anode having lower catalyst concentration will have a lower electronic conductivity, the electrolyte layer is typically the dominant contributor to cell resistivity (by several orders of magnitude). Accordingly, a large drop in anode conductivity can be tolerated.

In another embodiment of the present invention, a solid oxide fuel cell in which kinetic rates for internal reforming are controlled is proved. The solid oxide fuel cell of the invention comprises a cathode having one or more cathode flow channels, an electrolyte layer adjacent to the cathode, and an anode adjacent to the electrolyte layer. The anode used in the cell of the invention includes one or more anode flow channels. Each anode flow channel has an anode flow channel entrance and a catalyst that promotes reforming dispersed within or upon a surface of the one or more anode flow channels. The catalyst is dispersed within or upon the surface such that the rate of reforming increases at increasing distances from the anode flow channel entrance.

In yet another embodiment of the invention, a method of controlling kinetic rates for internal reforming in a solid oxide fuel cell is proved. The method of the invention is the method utilized in the solid oxide fuel cells of the invention for control reforming. The method of the invention comprises flowing fuel through the anode flow channel such that the fuel contacts a surface of the anode flow channel. The surface of the anode flow channel includes a catalyst that promotes reforming dispersed within or upon the surface with the same concentration profiles used in the fuel cells of the invention.

In still another embodiment of the invention, an automobile that is at least partially powered by the solid oxide fuel cells of the invention is provided.

DETAILED DESCRIPTION

The following examples illustrate the various embodiments of the present invention. Those skilled in the art will recognize many variations that are within the spirit of the present invention and scope of the claims.

Figure 1A:
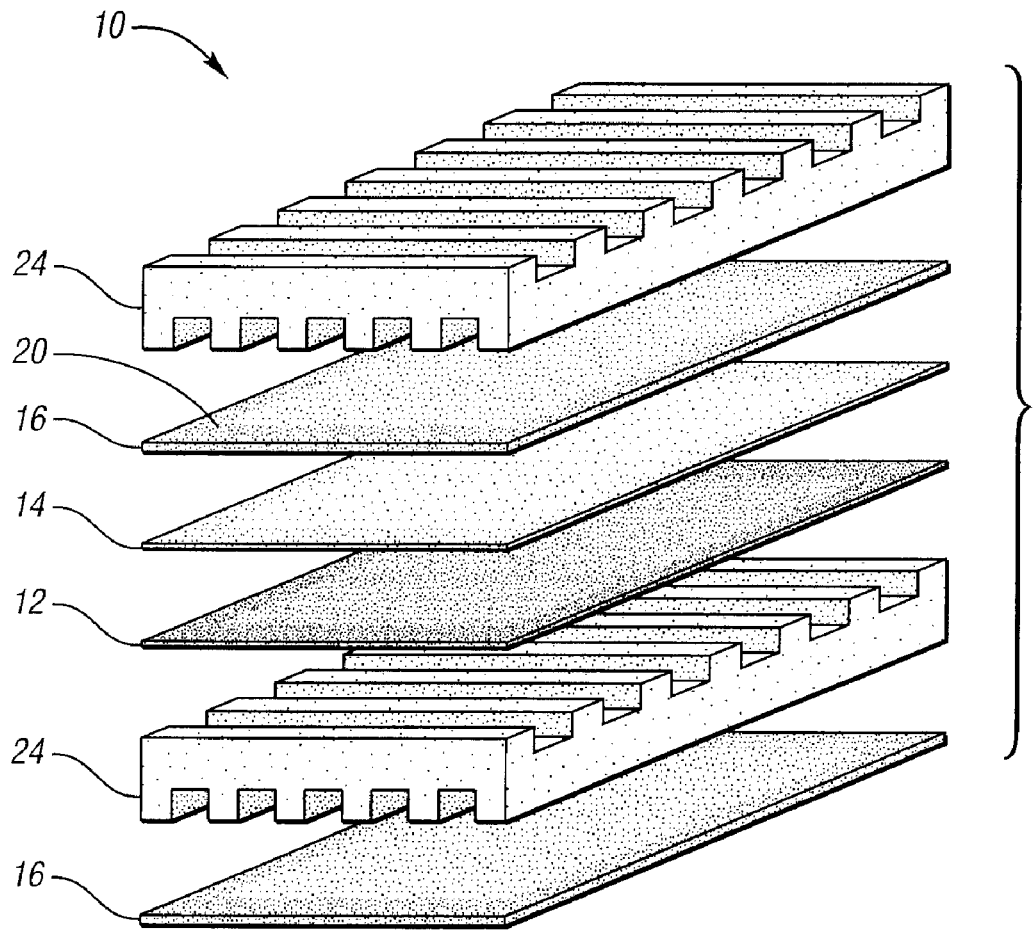
FIG. 1A is an exploded view of a solid oxide fuel cell in which the anode, cathode, and electrolyte layer are arranged in substantially parallel sheets.

In one embodiment of the present invention, a solid oxide fuel cell is provided. With reference to FIGS. 1A and B, schematics of a solid oxide fuel cell in which the anode, cathode, and electrolyte layer are arranged in substantially parallel sheets are provided. Solid oxide fuel cell 10 includes cathode 12, electrolyte layer 14 adjacent to cathode 12, and anode 16 adjacent to electrolyte layer 14. Anode 16 is made from support structure 20. Support structure as used herein means the solid material from which the anode is made. Anode 18 also includes a catalyst that promotes reforming. Accordingly, anode 18 is typically combination of a metal catalyst and a ceramic material. Such a compound structure is referred to a cermet. Typically, the anode layer in such fuel cells is made by standard ceramic processing techniques with a thickness on the order of 1 mm. It should be appreciated that the invention is in no way limited by the thickness of the anode. Examples of useful cermet for forming the anode include Ni—$Y_2O_3$ stabilized $ZrO_2$ ("Ni—YSZ"), nickel mixed with gadolina doped ceria (Ni—($Ce_{0.8}Gd_{0.2}O_2$) also written as Ni—(Ce,Gd)O2 or Ni—GDC), nickel mixed with yttria doped ceria zirconia (Ni—[$Y_2O_3$—$(CeO_2)_{0.7}$ $(ZrO_2)_{0.3}$] also written as Ni—YDCZ), and nickel mixed with yttria doped zirconia (Ni—Y-stabilized $ZrO_2$ also written as Ni—YSZ.)

Figure 1B:
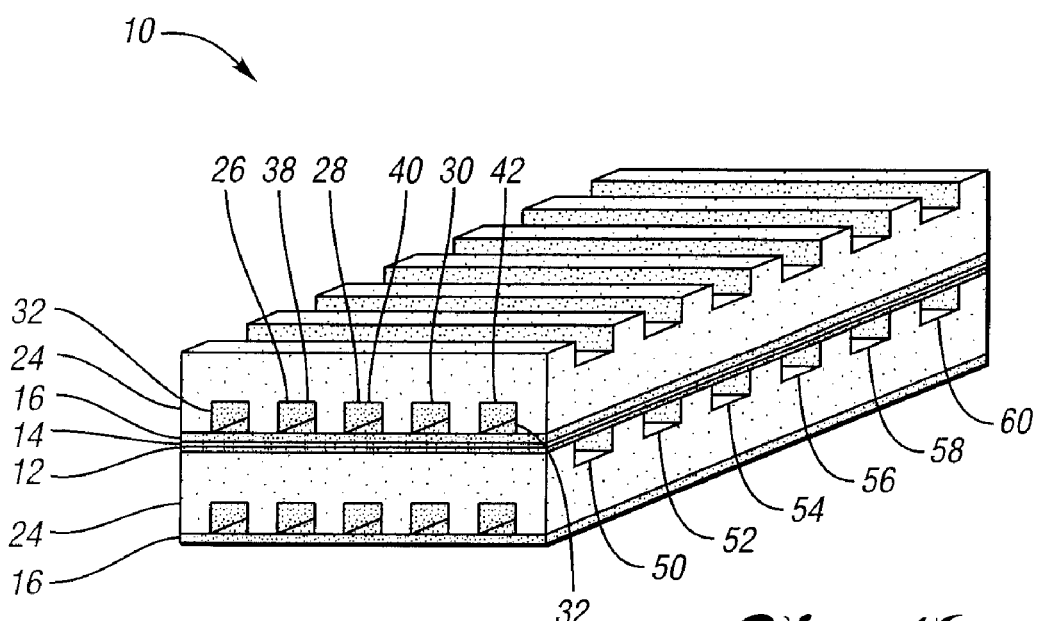
FIG. 1B is a schematic of a solid oxide fuel cell in which the anode, cathode, and electrolyte layer are arranged in substantially parallel sheets.

Still referring to FIGS. 1A and 1B, solid oxide fuel cell 10 may also include one or more additional anode flow channels 26-32 which are formed in a completely analogous manner to anode flow channel 22. The solid oxide fuel cell of the present invention includes at least one such anode flow channel. Anode flow channel 22 includes anode flow channel entrance 36 for the introduction of fuel to the solid oxide fuel cell and an anode flow channel exit (not shown) for removing unreacted fuel and/or by-products. Similarly, additional flow channels 26-34 also includes anode flow channel entrances 38-42 and anode flow exits (not shown). Fuel cell 10 also includes cathode flow channels 50-60 which are formed by cathode 12 and channel defining plate 24. An oxidizing component (e.g., air) is flowed through cathode flow channels 50-60. Anode flow channels 22, 26-32 may be arbitrarily oriented relative to the cathode flow channels to provide for cross-flows, counter-flows, or co-flows. In one variation of the invention, anode flow channels are perpendicular to the cathode flow channels. In another variation of the invention, the anode flow channels are parallel. In this latter variation, the cathode flow channels may allow the oxidizing component to flow in a direction opposite to the flow of the fuel in the anode flow channels or in the same direction as the flow of fuel in the anode flow channels. An example of a material from which cathode 12 may be formed include (La, Sr)(Co, Fe)$O_3$ which may be deposited by spray techniques. Cathode layers used in the invention typically have a thickness on the order of 20 microns. It should be appreciated that the invention is in no way limited by the thickness of the cathode. Finally, an example of a material from which electrolyte layer 14 may be formed is yttria stabilized zirconia. In a variation of the invention, the electrolyte is formed by screen printing or colloidal deposition. Electrolyte layers used in the invention typically have a thickness on the order of 10 microns. It should be appreciated that the invention is in no way limited by the thickness of the electrolyte layer.

As set forth above, solid oxide fuel cell 10 includes a catalyst. This catalyst is distributed within or upon at least one surface of the anode flow channels. For example, the catalyst is dispersed within or upon support structure 20 with a concentration profile such that the rate of reforming increases with increasing distances from anode flow channel entrance 36. Typically, this increasing rate is achieved by providing a catalyst concentration profile in which the catalyst has a first concentration at a first position and a second concentration at a second position such that the first position is closer to the anode flow channel entrance than the second position and the first concentration is lower than the second concentration. In such configurations, the catalyst concentration increases monotonically as distance from the anode flow channel entrance increases for positions between the first position and the second position. Although any number of concentration profiles are useful, a catalyst concentration that increases linearly between the first and second position as distance from the anode flow channel entrance increases is found to be satisfactory and relatively easy to implement. In other variations of the invention, the catalyst concentration increases in a stepwise manner between the first and second position as distance from the anode flow channel entrance increases. In one variation of the invention, the catalyst is present in an amount from about 1% to about 50% of the total weight of the anode. Examples of useful catalysts in the fuel cell of the invention include nickel metal or nickel-containing compounds. The anode having the catalysts concentration profiles set forth above may be achieved in a number of ways known to those skilled in the art. For example, the anode may be dipped in a solution containing the catalyst or the salt of the metal comprising the catalyst. The catalyst from the solution diffuses into the anode material (i.e., the solid support material). The anode is then withdraw at a time dependent rate such that the positions that will be further from the anode entrance channel have longer residence time in the solution thereby having higher catalyst concentrations. Moreover, the anode may be withdrawn under computer control to provide any desired catalyst concentration profile. Alternatively, the required concentration profile may be achieved by immersing an anode with integral anode channels into a liquid. After immersion, the catalyst or salt thereof is introduced into the liquid. As the catalyst diffuses into the liquid, more catalysts will in corporate at positions near the entrance to the anode channel than at positions away from the anode channel entrances. The anodes may then be cut such that the positions with lower catalyst concentrations to provide entrances with lower nearby catalyst concentrations. Alternatively, the catalyst concentrations of the invention are also achieved by high energy ion implantation. Variation in catalyst concentration may be achieved by, but is not restricted to, dipping the cell slowly into a solution from which Ni atoms are deposited, until the cell is entirely immersed, and then removed. If the catalyst deposition is diffusion-controlled, the amount of catalysts located at any position will depend on the geometry and on the time spent immersed.

Although the present invention has been described in detail for a planar solid oxide fuel cell, it should be appreciated that alternative designs are possible. For example, cylindrical solid oxide fuel cells are also known. In these designs, the anode, cathode, and electrolyte layers are concentric. As for the planar designs, these cylindrical fuel cells typically include at least one anode channel and at least one cathode channel.

In another embodiment of the invention, a method for controlling kinetic rates for internal reforming of fuel in solid oxide fuel cells is provided. The solid oxide fuel cells to which the method of the invention is applied typically include a cathode having one or more cathode flow channels and an anode having an anode flow channel having one or more anode flow channels. Each cathode flow channel has a cathode flow channel entrance and each anode flow channel has an anode flow channel entrance. The method of the invention will be recognized to be that method which is utilized in the solid oxide fuel cells to control reforming. The method of the invention comprises flowing fuel through the anode flow channel such that the fuel contacts a surface of the anode flow channel. The surface of the anode flow channel includes a catalyst that promotes reforming dispersed within or upon the surface. As set forth above, the concentration profile of the catalyst is such that the rate of the reforming reaction increases monotonically with distance from the entrance. The details of the catalyst and the catalyst concentration profile are the same as those set forth above.

During practice of the method of the invention, an oxidizing component is flowed through the cathode flow channel(s). The oxidizing component is necessary to complete the fuel cell circuit. Typically, the oxidizing component is an oxygen containing gas although any number of oxidizing components may be used, oxygen is the most common because of the ready availability of air. The flows of gas through the cathode flow channels and the anode flow channels may be in any direction relative to each other depending on the orientation of the cathode and anode flow channels. For example, the anode flow channel may be parallel or perpendicular to the cathode flow channels. In a variation of the invention, the oxidizing component is flowed through the cathode flow channel in an opposite direction than the fuel is flowed through the anode flow channel. This variation of course requires that the cathode and anode flow channels be substantially parallel.

Figure 2:
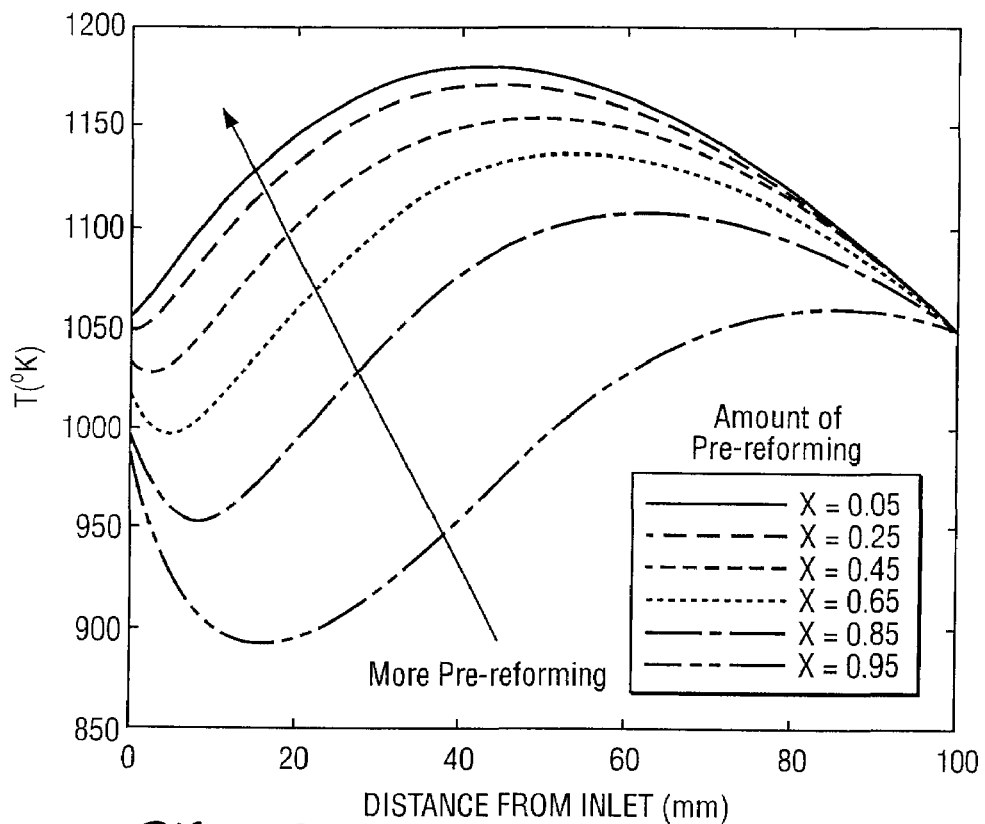
FIG. 2 provides plots of the temperature profile of an anode in a SOFC for mixtures containing varying amounts of pre-reformed fuel.
Figure 3:
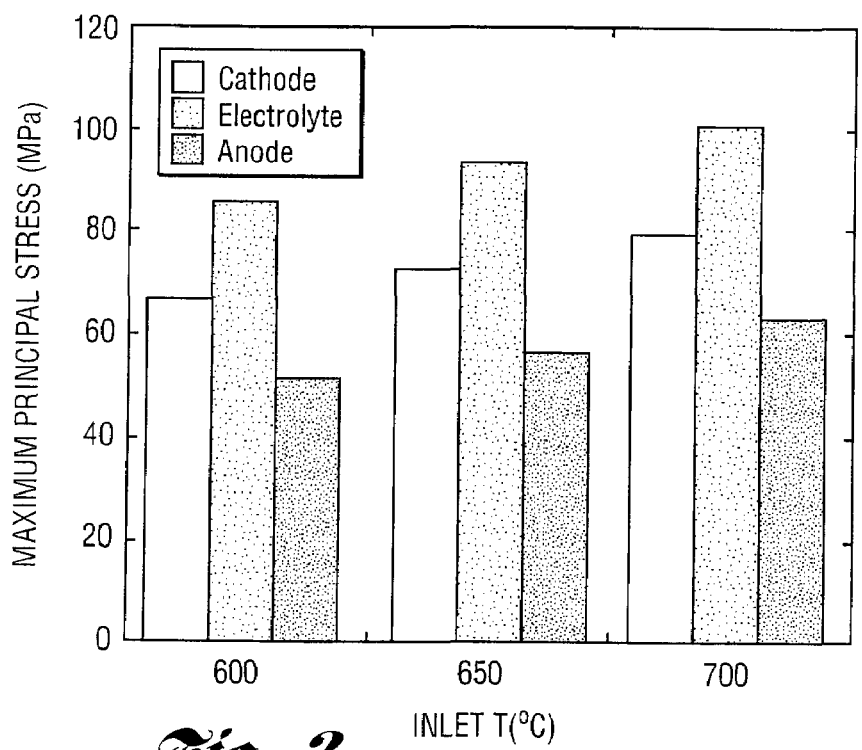
FIG. 3 is a bar chart providing the amounts of stress in the anode, cathode, and electrolyte layer of solid oxide fuel cells operated at 600° C., 650° C., and 700° C.
Figure 4:
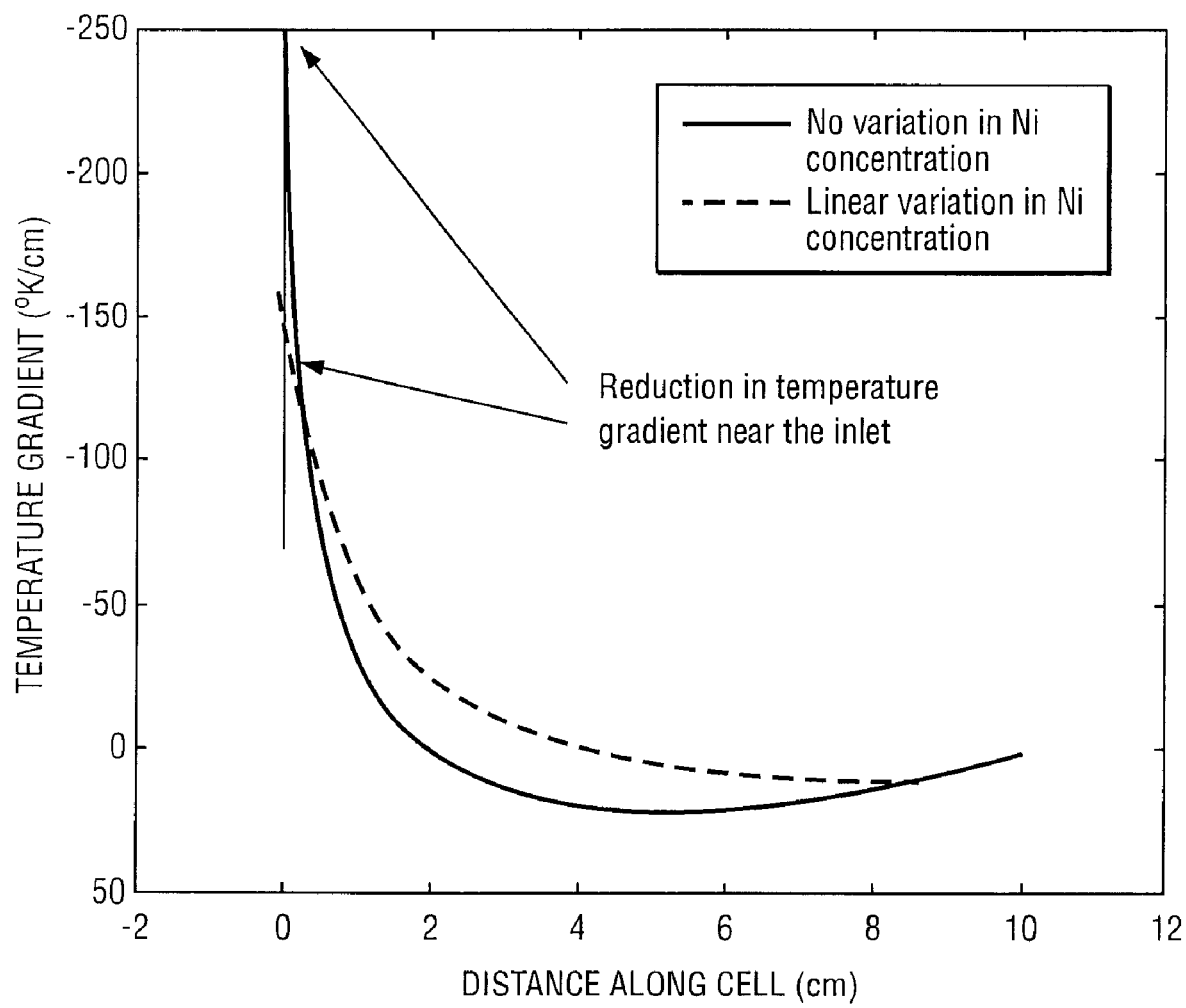
FIG. 4 provides plots of the temperature gradient in a fuel cell in which the nickel concentration does not vary compared to a fuel cell in which the nickel concentration varies linearly.

With reference to FIGS. 2-4, the advantages of the present invention are readily appreciated. FIG. 2 provides the temperature profile of a section of an anode in a SOFC for various mixtures of fuel provided to the anode. The fuel mixtures each contain varying amounts of "pre-reformed" fuel. "Pre-reformed" as used herein means that the indicated amount of reforming is present in the fuel prior to contacting of the anode (X=0.95 means 5% of the fuel is pre-reformed). At low amounts of pre-reforming, it is observed that there is a sharp temperature drop near the entrance to the anode where the fuel is first introduced. When there are small amounts of pre-reforming, more of the reforming occurs in the anode thereby causing the observed temperature gradients. As the amount of pre-reforming is increased, the magnitude of the temperature drop decreases. FIG. 3 is a bar chart providing the amounts of stress in the anode, cathode, and electrolyte layer of solid oxide fuel cells operated at 600° C., 650° C., and 700° C. In general, the amount of stress in each layer increases as the operating temperature increases. One source of this stress is the temperature gradient induced by reforming as indicated in FIG. 2. With reference to FIG. 4, plot of the temperature gradient in a fuel cell in which the nickel concentration is not varied is compared to a fuel cell in which the nickel concentration varies linearly is provided. The fuel cell with the linearly variation is observed to have a significantly lower temperature gradient near the inlet. This is the most important region because it is the region with the largest gradient (i.e., the regions with the greatest temperature drop).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A solid oxide fuel cell comprising:
   a cathode;
   an electrolyte layer adjacent to the cathode; and
   an anode adjacent to the electrolyte layer, the anode comprising:
      a support structure defining at least a portion of an anode flow channel, the anode flow channel having an anode flow channel entrance for the introduction of fuel to the solid oxide fuel cell and an anode flow channel exit; and
      a first and second catalyst that promote reforming and being dispersed within or upon the support structure such that the first catalyst has a first concentration at a first position and the second catalyst has a second concentration at a second position, wherein the first position is closer to the entrance than the second position and the first concentration is lower than the second concentration, and wherein the first and second catalyst are comprised of the identical catalyst material.

2. The solid oxide fuel cell of claim 1 wherein catalyst concentration monotonically increases as distance from the anode flow channel entrance increases for positions between the first position and the second position.

3. The solid oxide fuel cell of claim 2 wherein catalyst concentration increases linearly between the first and second position as distance from the anode flow channel entrance increases.

4. The solid oxide fuel cell of claim 1 wherein catalyst concentration increases stepwise between the first and second position as distance from the anode flow channel entrance increases.

5. The solid oxide fuel cell of claim 1 wherein the catalyst is present in an amount from about 1% to about 50 % of the total weight of the anode.

6. The solid oxide fuel cell of claim 1 wherein the anode, cathode, and electrolyte layer are arranged in substantially parallel sheets.

7. The solid oxide fuel cell of claim 6 further comprising one or more additional anode flow channels.

8. The solid oxide fuel cell of claim 6 wherein the cathode defines at least a portion of a cathode flow channel, the cathode flow channel having a cathode flow channel entrance for the introduction of an oxidizing component into the cathode flow channel and a cathode flow channel exit.

9. The solid oxide fuel cell of claim 8 wherein the cathode flow channel is adapted to allow flow of the oxidizing component in a direction opposite to the flow of the fuel in the anode flow channel.

10. The solid oxide fuel cell of claim 1 wherein the anode, cathode, and electrolyte layer are arranged concentrically.

11. The solid oxide fuel cell of claim 1 wherein the catalyst material comprises nickel or a nickel-containing compound.

12. An automobile at least partially powered by the solid oxide fuel cell of claim 1.

13. A solid oxide fuel cell comprising:
a cathode having one or more cathode flow channels;
an electrolyte layer adjacent to the cathode; and
an anode adjacent to the electrolyte layer, the anode comprising one or more anode flow channels each anode flow channel having an anode flow channel entrance and a first and second catalyst that promotes reforming and being dispersed within or upon a surface of the one or more anode flow channels such that the first catalyst has a first concentration at a first position and the second catalyst has a second concentration at a second position, wherein the first position is closer to the anode flow channel entrance than the second position and the first concentration is lower than the second concentration, and wherein the first and second catalyst are comprised of the identical catalyst material.

14. The solid oxide fuel cell of claim 13 wherein catalyst concentration monotonically increases as distance from the anode flow channel entrance increases for positions between the first position and the second position.

15. The solid oxide fuel cell of claim 14 wherein catalyst concentration increases linearly between the first and second position as distance from the anode flow channel entrance increases.

16. The solid oxide fuel cell of claim 13 wherein the catalyst comprises nickel or a nickel-containing compound.

17. The solid oxide fuel cell of claim 1, wherein the first catalyst is presented with a lower fuel reforming rate compared to the second catalyst.

* * * * *

UNITED STATES PATENT AND TRADEMARK OFFICE
CERTIFICATE OF CORRECTION

PATENT NO. : 7,638,226 B2 Page 1 of 1
APPLICATION NO. : 10/710459
DATED : December 29, 2009
INVENTOR(S) : Ellwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1558 days.

Signed and Sealed this

Twenty-first Day of December, 2010

David J. Kappos
*Director of the United States Patent and Trademark Office*